HEADERS AND METHOD OF MAKING SAME

Filed Sept. 4, 1958

INVENTORS
VINCENT SUSSMAN AND
STEPHEN J. SINER
BY Harry G. Shapiro
ATTORNEY 3,037,070

HEADERS AND METHOD OF MAKING SAME

Vincent Sussman, Union, and Stephen J. Siner, Maplewood, N.J., assignors to Joseph Waldman & Sons, Irvington, N.J., a partnership Filed Sept. 4, 1958, Ser. No. 759,068
11 Claims. (Cl. 174—152)

The invention relates to improvements in hermetically sealing an electrical conductor, terminal, lead or the like extending through an electrically insulating base, wall, barrier or the like, and is more particularly directed to an improved plastic header, and methods for making headers.

For many applications, particularly where extreme temperature and humidity conditions are encountered, the electrical insulator, as well as the area of the bond between the electrical conductor and the insulator, must serve to provide an hermetic seal. It will be apparent the a header must also protect the electrical or electronic component against the influence of exterior conditions and influences, such as variations in temperature and humidity, pressure, impact or shock, and various chemicals with which it may otherwise come in contact. A combination of glass and metal, providing what is known as a glass header, furnishes an excellent hermetic seal and is widely used in the electrical and electronic components industry.

The term "conductor," as hereinafter used in the specification and claims, in intended to refer to an electrical conductor, terminal or lead of desired configuration; and the term "header," refers to a unit of electrical insulating material for lamps, tubes, switches, capacitors, resistors, or anywhere else that a conductor is brought through the insulating material and hermetically sealed, the unit being intended for attachment or connection to a surrounding wall, barrier, container, can or envelope for housing an electrical or electronic component.

Despite the excellent hermetic properties afforded by glass headers, there are numerous difficulties inherent in their manufacture and use. Glass-to-metal seals, in order to retain some measure of ability to withstand shock, are generally made with a compression seal. This involves a delicately balanced combination of stresses, which makes the product susceptible to cracking. Also, glass headers, or headers wherein ceramics are substituted for the glass, require the use of high temperatures in processing. Even when using so-called low temperature glasses or ceramics, a temperature on the order of at least 800° F. is required. This necessitates that the metal components, conductors and the peripheral retaining ring for securing the header to an envelope or surrounding wall, be especially treated to withstand the high temperatures involved, thereby adding to the problems and cost of manufacture. The problems arising from the need to use high temperatures in the process of manufacturing glass or ceramic headers are present whether the insulating material is in the form of preformed blank, or used as molten glass and molded about the metal components as inserts.

It has been proposed to overcome some of the foregoing problems attending the manufacture and application of glass headers by substituting various plastic materials or synthetic resins for the glass. Various molding techniques have been used, including compression, injection and transfer molding. Producing headers with a synthetic resin as the insulating material involves the use of molds which are constructed to support the metal components as inserts in the mold. While such molds are not necessarily complicated, there are still the problems of coring, or the necessity to exercise care in forming the recesses to tightly hold the inserts; otherwise, the molding compound will flow over the inserts when pressure is applied. Also, prior art molding of plastic headers requires subsequent trimming or cleaning of the product.

The primary objects of the present invention are to provide a plastic header of improved construction, and a method for making headers which eliminates the problems and difficulties referred to above attending the manufacture of glass and plastic headers of known construction. Headers made in accordance with the invention afford a combination of product and manufacturing advantages, including an hermetic seal of excellent quality; a high measure of resistance to external conditions, such as pressure, shock, chemicals, and abrupt variations in temperature and humidity; the molds required to make the product are of utmost simplicity; and the temperatures involved, both in making the header and applying the header to another component or envelope, are of such minimal degree that it is unnecessary to resort to special conditioning or finishing treatments of the metal components to compensate for, or protect against, the effects of temperature.

In accordance with the invention generally, the foregoing objectives, purposes and advantages are accomplished by making a header having an epoxy resin as the insulating medium and the bonding means for the conductor or conductors extending therethrough. The epoxy resin header of the invention is made by providing a preformed, substantially dish-shaped member molded of an epoxy resin. The dish-shaped member is a relatively shallow receptacle or container, and may be in the form of a relatively thin disk comprising a flat bottom wall and having an upstanding, integral, flow-limiting portion located in the vicinity of the disk's periphery and in surrounding, spaced relationship with respect to the entire area of the bottom wall through which the conductors extend. The bottom wall of the dish-shaped member is provided with apertures extending therethrough to accommodate the insertion and positioning of the conductors. The apertures are preferably drilled through the dish-shaped member at the positions and in the number desired. The apertures have a diameter slightly greater than the diameter of the conductors to be positioned and extended therethrough. If desired, the apertures may be formed in the molding of the dish-shaped member. However, where headers of the same diameter will be used, but which vary in the number, size and/or positions of the conductors, the inventory problem is obviated by drilling the holes through the dish-shaped members to suit.

With the simply shaped, dish-shaped, apertured epoxy resin member serving as a container or mold, and to locate the conductors, a sealant of epoxy resin is placed within the dish-shaped member. The epoxy resin sealant is of a measured or metered amount to fill or substantially fill the cavity provided by the dish-shaped member. Preferably, the epoxy resin sealant is a dry blend of epoxy resin, hardener, and filler shaped into the form of a pellet or single charge. If desired, the sealant may be in the form of a powder or liquid. Heat is applied to the assembly, causing flow, where the sealant is in powder or pellet form, and activation and curing of the epoxy resin sealant. In regular manufacturing practice, trays containing a plurality of the described header assemblies are subjected to heat for processing in bulk.

The temperature to activate and cure the epoxy resin sealant is of a low order of magnitude, being not in excess of approximately 400° F., and preferably between 250° and 300° F. The resulting bond with the conductors and the dish-shaped member is excellent. The temperature for activating and curing the sealant is less than the temperature which will disturb the dimensional stability of the dish-shaped member. The cured and hardened epoxy resin sealant becomes a layer of substantially uniform thickness which is contained within, is substantially co-extensive with and is homogeneously bonded to the dish-shaped member of the same material. The layer of hardened sealant structurally reinforces the relatively thin dish-shaped member to impart resistance to pressure, shock, and impact forces to the finished assembly. The thus reinforced and rigidified header withstands abrupt changes in temperature and humidity, coupled with excellent electrical sealing characteristics.

The preformed epoxy resin dish-shaped member initially is in a fully cured or a partially cured state, the latter being preferred. When the epoxy resin sealant is introduced into a partially cured dish-shaped member, with the conductors in position extending therethrough, and heat is applied to the assembly, the residual epoxy linkages of the partially cured member provides an even more homogeneous bond with the epoxy sealant.

For many applications, the header of the invention permits the elimination of the metal retaining ring located at the periphery of prior art glass and plastic headers. An epoxy resin adhesive is preferably utilized to secure the epoxy resin header of the invention directly to an envelope or can containing an electrical or electronic component, or to the surrounding wall or barrier within which it is desired to secure the header. The excellent adhesive qualities, as well as the dielectric properties, of epoxy resins are well-known. The dish-shaped member of epoxy resin may be initially molded at its peripheral area to further facilitate connection with an envelope, container or the like. For this purpose, the periphery of the dish-shaped member may be molded with a groove, or other suitably rabbetted portion, without unduly complicating the otherwise simple contour of the mold.

In greater detail, reference is made to the following detailed description, together with the drawing illustrating several preferred embodiments of the invention, in which.

Figure 1:
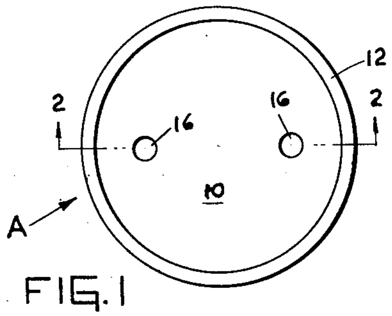
FIG. 1 is a top plan view of an apertured, dish-shaped member made in accordance with one form of the invention.
Figure 3:
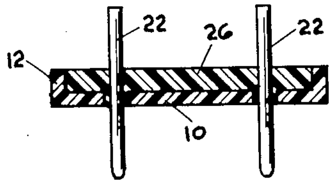
FIG. 3 is a vertical cross-section of a finished header.
Figure 2:
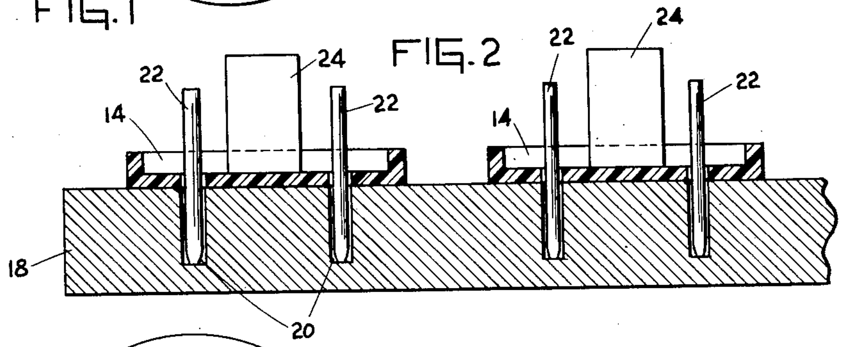
FIG. 2 is a vertical cross-section taken approximately in the plane of line 2—2 of FIG. 1, but additionally showing a plurality of dish-shaped members each having conductors positioned in the apertures and containing a pellet of epoxy resin sealant, preparatory to activating the sealant and completing the header assemblies.

Referring to FIGS. 1 to 3, a dish-shaped member or disk A is preferably formed by compression molding an epoxy resin composition to provide a bottom wall 10 and an integral, upstanding rim portion 12, thereby providing a cavity 14. While the dish-shaped member illustrated is circular in outline, it will be understood that any desired shape may be made depending upon the contour of the envelope, container, can or wall opening to or within which the header is to be connected.

A preferred formulation which may be used for molding the dish-shaped members is as follows, the amounts indicated being in parts by weight:

| | |
|---|---|
| Epoxy resin | 100 |
| Filler | 50 |
| Curing agent | 15 |

An example of a suitable proprietary epoxy resin is

Shell Epon 828, made by the Shell Company; and an example of a suitable filler is an inert mineral powder, such as 200 mesh slate powder. The curing agent may be any of the well-known epoxy resin hardeners, such as the aromatic amines, an example of which is metaphenylene diamine, a lower aliphatic amine, such as triethylene tetramine, or an acid anhydride, such as phthalic anhydride.

The slate powder is added to the epoxy resin and mixed. The curing agent, metaphenylene diamine, is then added and thoroughly blended. The mixture is then poured into pans, and within several hours starts to harden to the B-stage. The mixture is pulverized into powder, and is used in the compression molding of the dish-shaped members A. Preferably, the dish-shaped members are molded to a partially cured state, that is, the composition is gelled, and upon the application of heat will not liquefy, but is short of complete curing. A suitable molding cycle is from 5 to 10 minutes at approximately 250° to 300° F. The mold should be highly polished and coated with a release agent. If desired, a viscous liquid mixture of epoxy resin and hardener, with or without filler, in desired proportions, may be poured directly into the mold cavities and fully or partially cured.

If desired, apertures 16 may be molded directly through the bottom wall 10. As previously indicated, however, and to realize the benefits of minimum inventory, it is preferred to mold the dish-shaped members without apertures and to drill the apertures through the dish-shaped members when they are ready to be assembled with the conductors. The partially cured dish-shaped members A have a long shelf-life, and will not distort or lose their dimensional stability at temperatures up to approximately 400° F.

In accordance with a preferred form of the invention, a preformed charge or pellet of predetermined and measured amount of epoxy resin is used as the sealant to fill the volume of the cavity 14, and to secure the conductors in position. A suitable formulation for making individual pellet charges is as follows, the amounts indicated being in parts by weight:

| | |
|---|---|
| Epoxy resin | 100 |
| Filler | 50 |
| Curing agent | 30 |

An example of a preferred proprietary epoxy resin is Ciba Araldite 6060, and a preferred curing agent is phthalic anhydride, the filler being slate powder of approximately 200 mesh. The epoxy resin is melted by heating to a temperature of approximately 250° F., whereupon the slate powder is added and mixed with the resin. The phthalic anhydride is then blended in, and the ingredients mixed for approximately 20 minutes at approximately 250° F. The mixture, while hot, is poured into pans and cooled to a substantially solid state, following which, it is broken into lumps and pulverized. The resultant powder is shaped into individual pellets, to provide a solid solution state of the composition. The shaping or compression of the powder may be accompanied with the aid of a slight degree of heat. The pellets are still in a thermoplastic condition, and will melt or liquefy at a temperature of between approximately 250° and 300° F. before beginning to gel and cure.

As shown in FIG. 2, a tray 18 made of a suitable heat resistant material is provided with a plurality of openings 20 suitably spaced to correspond to the spacing desired between conductors in each of the finished headers. Also, the openings 20 have a depth equal to the distance that is desired that the conductors, designated 22, shall extend from the sides of the finished header. The dish-shaped members A are placed upon the tray with the apertures 16 in alignment with the openings 20. The conductors are inserted through the apertures and into the tray openings. A pellet 24 of the epoxy resin sealant is placed in each of the dish-shaped members A. Although the illustrated dish-shaped members are each provided with two apertures, it will be understood, of course, that there may be any desired number of apertures to correspond to the number and spacing of conductors desired.

The tray, with the described assemblies in position, is placed in an oven, or otherwise subjected to heat, at a temperature of approximately 300° F. for a period of three hours. If desired, a lower temperature and longer period of time may be used, for example, 250° F. for twelve hours. The pellets melt, flow about the conductors, and fill out the cavity 14 of each of the dish-shaped members. The epoxy resin sealant also flows down into the apertures 16 and around the conductors in this area. The sealant hardens and cures to provide, as shown in FIG. 3, a layer 26 which is substantially coextensive with the dish-shaped member. The shape of the layer of sealant will depend upon the contour of the cavity 14, it being preferred that the layer be of substantially uniform thickness as shown. The partially cured dish-shaped members, as well as the sealant, are now fully cured, homogeneously bonded to each other, and to the conductors. After removal from the source of heat, the finished headers are removed from the tray.

Instead of a preformed pellet, the epoxy resin sealant may be in the form of a dry powder, as above described prior to shaping, or a liquid composition. It will also be understood that additives may be incorporated in the epoxy resin composition for the dish-shaped members and the sealant, such as pigments, flexibilizers, and various reinforcing agents for modifying the properties of the dish-shaped members, the sealant and the finished header.

Figure 4:
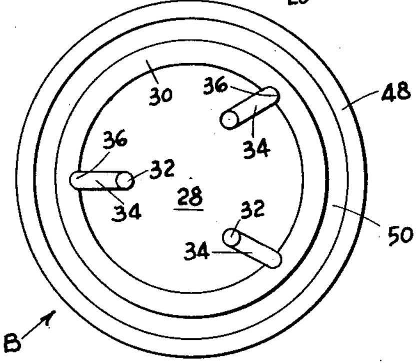
FIG. 4 is a top plan view of an apertured, dish-shaped member made in accordance with another form of the invention.
Figure 5:
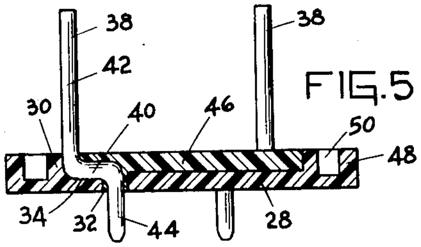
FIG. 5 is a vertical cross-section of a finished header made with the member of FIG. 4.

In the form of the invention illustrated in FIGS. 4 and 5, a dish-shaped member B is constructed to permit the conductors to be secured in position with added bonding strength. Also, this form of the invention permits the conductors to be arranged on different diameters on opposite sides of the header. In this manner one is not restricted to the same positioning of the leads for an electronic component within an envelope or can, as the location of the prongs or conductors on the outside of the envelope or can.

The dish-shaped member B comprises a bottom wall 28 and a circumferential upstanding rim 30 in the vicinity of the periphery of the member to furnish a cavity for receiving the sealant. Apertures 32 extend through the bottom wall, three apertures being shown arranged on a common radius. A recess 34 is formed in the upper face of the bottom wall to extend laterally or radially of each of the apertures 32. The recesses may be molded into the dish-shaped member, and the apertures then drilled; or, the recesses and apertures may both be formed in the molding of the dish-shaped members. Each of the recesses 34 which preferably is contoured to matingly receive a portion of a conductor, may extend in any desired direction laterally of the aperture. In the form of the invention illustrated, the recesses each extend laterally outward of an aperture. Also, to additionally aid in positioning the conductors, the recesses may, if desired, each terminate within the rim 30, whereby the rim will have a vertical extending recess 36 therein in connection with a recess 34. In the embodiment illustrated, provision is made for the header to receive three conductors. It will be understood, however, that any desired number of conductors may be assembled with a dish-shaped member, whereupon an appropriate number of apertures and corresponding number of recesses will be provided. Also the disposition of a recess with respect to an aperture may be such that the conductors are located on the smaller diameter on sealant side of the header instead of the opposite side as shown.

Conductors 38 for assembly with each of the dish-shaped members B are each provided with a pair of right angle bends to form a laterally extending portion 40 intermediate the end portions 42 and 44. With a conductor portion 44 positioned to extend through an aperture 32, the conductor portion 40 is positioned in a recess 34, with the conductor portion 42, immediately above the portion 40 being received within a recess 36. In the form of the invention illustrated, the recesses are semi-cylindrical in shape to receive part of the cylindrical portions 40. It will be understood, however, that the recesses may be of any desired shape consistent with realizing an increased bond with the conductors. With the conductors thus positioned within and extending through the epoxy resin dish-shaped member, the epoxy resin sealant is placed within the dish-shaped member, heated and cured to form the coextensive layer 46. The described arrangement, with the substantial and increased length of conductor, the portion 40, in contact with the sealant, imparts additional bonding strength between the conductor and the insulating medium.

The form of the invention illustrated in FIGS. 4 and 5 also shows the dish-shaped member B molded with a second circumferentially arranged rim portion 48 laterally or radially spaced from the rim portion 30 to provide an intermediate circumferential groove 50. The formation of the groove, as well as the recesses merely involve providing corresponding projections on one of the mold halves, and does not complicate the simple contour of the mold. It will be apparent that the dish-shaped members A may also be molded with a circumferential groove, such as the groove 50, if desired.

Figure 6:
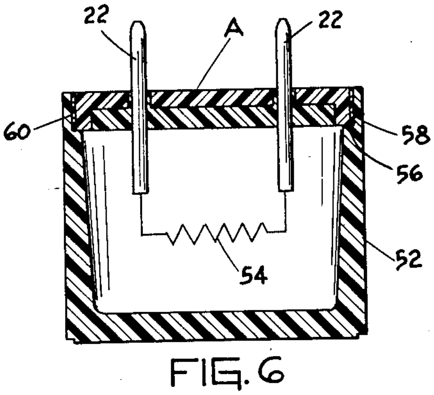
FIG. 6 is a vertical cross-section showing the header of FIG. 3 secured to a can for housing an electronic or electrical component.

FIG. 6 shows the header of FIG. 3 used to close a can 52 in which an electrical or electronic component, generally and schematically indicated by the element 54, is to be located. In the form of the invention illustrated, the can may also be molded of epoxy resin, and as shown is molded at its open end with a rabbetted portion providing a step 56 below a riser portion 58. The periphery of the header is coated with an epoxy resin adhesive 60, or the adhesive coating may be applied to the riser and step portions of the can, or both. The header is placed into position, and after the epoxy resin adhesive 60 is cured, the can is hermetically sealed throughout.

Figure 7:
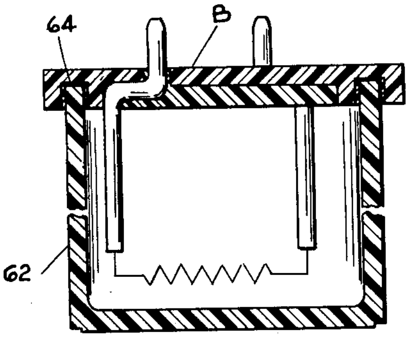
FIG. 7 is a view similar to FIG. 6 showing the header of FIG. 5 secured to a can.

FIG. 7 shows the header of FIG. 5 used to close the open end of a can, container or envelope for an electrical or electronic component. The container may be of metal, plastic or glass. The groove 50 may have its walls coated with epoxy resin adhesive 64, or the top edge of the can may be so coated, or both mating portions may be coated with the adhesive. After assembly and curing of the epoxy resin adhesive, a hermetic seal is also provided between the header and the component container.

It is believed that the advantages of the invention will be apparent from the foregoing detailed description of several preferred embodiments of the invention. It will be understood that various modifications and changes may be made without departing from the spirit and scope of the invention as sought to be defined in the following claims.

We claim:

1. An article adapted for use in the manufacture of headers, the article comprising a disk of epoxy resin having a bottom wall and an integral, upstanding, flow-limiting portion in the vicinity of the periphery of the disk to provide a relatively shallow, dish-shaped member having a cavity for receiving a sealant, the bottom wall inwardly of said flow-limiting portion on the cavity side of the member being provided with a laterally extending recess to receive a portion of a conductor.

2. An article adapted for use in the manufacture of headers, the article comprising a disk of epoxy resin having a bottom wall and an integral, upstanding, flow-limiting portion in the vicinity of the periphery of the disk to provide a relatively shallow, dish-shaped member having a cavity for receiving a sealant, the bottom wall inwardly of said flow-limiting portion on the cavity side of the member being provided with a laterally extending recess to receive a portion of a conductor, the periphery of the dish-shaped member being rabbetted for mating connection of the article to a wall.

3. An article adapted for use in the manufacture of headers, the article comprising a disk of epoxy resin having a bottom wall and an integral, upstanding, flow-limiting portion in the vicinity of the periphery of the disk to provide a relatively shallow dish-shaped member having a cavity for receiving a sealant, the bottom wall inwardly of said flow-limiting portion being provided with an aperture extending therethrough, a recess on the cavity side of the member extending laterally of the aperture to receive a portion of a conductor.

4. An article adapted for use in the manufacture of headers, the article comprising a partially cured disk of epoxy resin having a bottom wall and an integral, upstanding, flow-limiting portion in the vicinity of the periphery of the disk to provide a relatively shallow, dish-shaped member having a cavity for receiving a sealant, the bottom wall inwardly of said flow-limiting portion being provided with an aperture extending therethrough, a recess on the cavity side of the member extending laterally of the aperture to receive a portion of a conductor, the periphery of the dish-shaped member being rabbetted from mating connection of the article to a wall.

5. A header comprising a relatively shallow, preformed, apertured dish-shaped member of epoxy resin having a cavity on a side thereof, a recess formed in the dish-shaped member on the cavity side thereof extending laterally of the aperture, a conductor extending through the aperture to opposite sides of the header, said conductor being provided with a laterally extending portion positioned in said recess, and a substantially coextensive layer of epoxy resin sealant contained in and bonded to the dish-shaped member and to the conductor, thereby securing the conductor in position and reinforcing the dish-shaped member.

6. A header comprising a relatively shallow, preformed apertured dish-shaped member of partially cured epoxy resin having a cavity on a side thereof, a recess formed in the dish-shaped member on the cavity side thereof extending laterally of the aperture, a conductor extending through the aperture to opposite sides of the header, said conductor being provided with a laterally extending portion positioned in said recess, and a substantially coextensive layer of epoxy resin sealant contained in and bonded to the dish-shaped member and to the conductor, thereby securing the conductor in position and reinforcing the dish-shaped member, the periphery of the dish-shaped member being rabbeted for mating connection of the header to a wall.

7. A method of making a header comprising providing a disk of partially cured epoxy resin having a bottom wall and an integral, upstanding, flow-limiting portion in the vicinity of the periphery of the disk, said disk having a cavity on a side thereof and an aperture extending through said bottom wall, the lateral dimension of the bottom wall being substantially greater than the height of said flow-limiting portion, positioning a conductor in said aperture so that both ends of the said conductor will be exposed upon final assembly, placing a preformed pellet of an epoxy resin sealant in said cavity, said pellet being liquefiable to substantially fill the cavity when heat is applied, and the sealant being curable at a temperature less than the temperature which will disturb the dimensions of the disk, and heating the assembly to cure the disk and to liquefy and cure the sealant, whereby the conductor is secured in position and the disk is reinforced by a substantially coextensive layer of the cured sealant.

8. A method of making a header comprising providing a disk of epoxy resin having a bottom wall and an integral, upstanding, flow-limiting portion in the vicinity of the periphery of the disk, said disk having a cavity on a side thereof and an aperture extending through said bottom wall, the lateral dimension of the bottom wall being substantially greater than the height of said flow-limiting portion, positioning a conductor in said aperture so that both ends of the said conductor will be exposed upon final assembly, placing a preformed pellet of an epoxy resin sealant in said cavity, said pellet being liquefiable to substantially fill the cavity when heat is applied, and the sealant being curable at a temperature less than the temperature which will disturb the dimensions of the disk, and heating the pellet to liquefy and cure the sealant, whereby the conductor is secured in position and the disk is reinforced by a substantially coextensive layer of the cured sealant.

9. An article adapted for use in the manufacture of headers, the article comprising a molded disk of electrically insulating material having a bottom wall and an integral, upstanding, flow-limiting portion in the vicinity of the periphery of the disk to provide a relatively shallow, dish-shaped member having a cavity for receiving a sealant, the bottom wall inwardly of said flow-limiting portion on the cavity side of the member being provided with a laterally extending recess to receive a portion of a conductor.

10. An article adapted for use in the manufacture of headers, the article comprising a molded disk of electrically insulating material having a bottom wall and an integral, upstanding, flow-limiting portion in the vicinity of the periphery of the disk to provide a relatively shallow, dish-shaped member having a cavity for receiving a sealant, the bottom wall inwardly of said flow-limiting portion being provided with an aperture extending therethrough, a recess on the cavity side of the member extending laterally of the aperture to receive a portion of a conductor.

11. A header comprising a molded disk of electrically insulating material having a bottom wall and an integral, upstanding, flow-limiting portion in the vicinity of the periphery of the disk providing a cavity on a side of the disk, an aperture extending through said bottom wall, a recess formed in the bottom wall on the cavity side thereof extending laterally of the aperture, a conductor extending through the aperture to opposite sides of the disk, said conductor being provided with a laterally extending portion positioned in said recess and a substantially coextensive layer of epoxy resin sealant contained in said cavity and bonded to the disk and to the conductor, thereby securing the conductor in position and reinforcing the disk.

References Cited in the file of this patent

UNITED STATES PATENTS

| | | |
|---|---|---|
| 2,096,156 | Breyer | Oct. 19, 1937 |
| 2,285,136 | Abendroth | June 2, 1942 |
| 2,438,993 | De Boer | Apr. 6, 1948 |
| 2,444,880 | Robinson | July 6, 1948 |
| 2,763,708 | Brennan | Sept. 18, 1956 |
| 2,773,158 | Myers | Dec. 4, 1956 |
| 2,776,467 | Brennan | Jan. 8, 1957 |
| 2,862,992 | Franz | Dec. 2, 1958 |
| 2,911,683 | Palermo | Nov. 10, 1959 |

FOREIGN PATENTS

| | | |
|---|---|---|
| 966,369 | France | Mar. 1, 1950 |
| 212,287 | Australia | Jan. 23, 1958 |
| 935,915 | Germany | Dec. 1, 1955 |

OTHER REFERENCES

Publication I: "These Little E-Form Pellets Will Revolutionize Your Encapsulation Procedures," Electronic Design, Jan. 22, 1958, page 10.